(12) United States Patent
Shu et al.

(10) Patent No.: US 8,089,199 B2
(45) Date of Patent: Jan. 3, 2012

(54) MECHANICAL DESIGN OF LAMINAR WEAK-LINK ROTARY MECHANISMS WITH TEN-DEGREE-LEVEL TRAVEL RANGE AND TEN-NANORADIAN-LEVEL POSITIONING RESOLUTION

(75) Inventors: Deming Shu, Darien, IL (US); Jorg M. Maser, Oak Park, IL (US)

(73) Assignee: UChicago Argonne, LLC, Chicago, IL (US)

( * ) Notice: Subject to any disclaimer, the term of this patent is extended or adjusted under 35 U.S.C. 154(b) by 72 days.

(21) Appl. No.: 12/815,655

(22) Filed: Jun. 15, 2010

(65) Prior Publication Data

US 2011/0064964 A1 Mar. 17, 2011

Related U.S. Application Data

(60) Provisional application No. 61/243,298, filed on Sep. 17, 2009.

(51) Int. Cl.
*H01L 41/08* (2006.01)
*H01L 29/06* (2006.01)
(52) U.S. Cl. ...................... 310/328; 428/591
(58) Field of Classification Search .................. 310/328
See application file for complete search history.

(56) References Cited

U.S. PATENT DOCUMENTS

| | | |
|---|---|---|
| 5,896,200 A | 4/1999 | Shu |
| 6,607,840 B2 | 8/2003 | Shu et al. |
| 6,822,733 B1 | 11/2004 | Shu |
| 6,984,335 B2 | 1/2006 | Shu et al. |
| 2010/0068551 A1 | 3/2010 | Shu et al. |

*Primary Examiner* — Mark Budd
(74) *Attorney, Agent, or Firm* — Joan Pennington

(57) ABSTRACT

Enhanced mechanical designs are provided for weak-link rotary mechanisms for implementing angular rotations with a defined angular travel range and positioning resolution, for example, with ten-degree-level travel range and ten-nanoradian-level positioning resolution. A weak-link rotary structure has a predetermined pattern for implementing angular rotations with repeatable and reliable angular travel range and positioning resolution including a plurality of connecting links radially extending from a central portion with a predefined angular separation between the connecting links; each said connecting link having at least one pair of weak-link connections; alternate connecting links being coupled to a respective terminal, each said respective terminal being mounted to a connecting carriage; remaining other connecting links being coupled to a respective mounting portion of a mating part of the weak-link rotary structure.

18 Claims, 7 Drawing Sheets

MECHANICAL DESIGN OF LAMINAR WEAK-LINK ROTARY MECHANISMS WITH TEN-DEGREE-LEVEL TRAVEL RANGE AND TEN-NANORADIAN-LEVEL POSITIONING RESOLUTION

This application claims the benefit of U.S. Provisional Application No. 61/243,298 filed on Sep. 17, 2009.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to a novel mechanical design for enhanced laminar weak-link rotary mechanisms for implementing angular rotations, for example, with ten-degree-level travel range and ten-nanoradian-level positioning resolution.

DESCRIPTION OF THE RELATED ART

U.S. Pat. No. 6,607,840, issued Aug. 19, 2003 and U.S. Pat. No. 6,984,335 issued Jan. 10, 2006 by Deming Shu, Thomas S. Toellner, E. Ercan Alp and assigned to the present assignee disclose redundantly constrained laminar structures as weak-link mechanisms and a novel method for manufacturing the redundantly constrained laminar structures as weak-link mechanisms. The method for producing the redundantly constrained laminar structures as weak-link mechanisms is carried out by lithographic techniques. A designed pattern is repeatedly chemically etched with a mask to produce a plurality of individual identical units. The units are stacked together to form the laminar structure and are secured together with fasteners. A high quality adhesive can be applied to the sides of the laminar structure to provide the mechanism equivalent to a single piece mechanism. The redundantly constrained laminar structures as weak-link mechanisms of the invention include a stack of a plurality of thin material structures. The stack of structures forming a laminar structure include multiple weak-link connections providing controllable movements in a plane of the layer and having a desired stiffness and stability. The plurality of thin material structures include predetermined locating-holes used with locating-pins to precisely stack the thin material structures together and are used to secure the stack together with fasteners.

U.S. patent application Ser. No. 12/233,228, filed Sep. 18, 2008, by the present inventors and assigned to the present assignee, discloses an enhanced mechanical design of laminar weak-link mechanisms with centimeter-level travel range and sub-nanometer positioning resolution. A multiple parallelogram weak-link structure includes a predefined pattern of a plurality of perpendicularly arranged groups of connecting links, each link having at least one pair of weak-link connections. Each of the plurality of perpendicularly arranged groups includes a terminal for mounting to a fixed base. The multiple parallelogram weak-link structure includes a moving part for mounting on a carriage, providing precisely controlled movement with stability in one direction. A two-dimensional (2D) ultra-precision scanning stages assembly for x-ray nanoprobe applications includes multiple redundantly constrained weak-link structures, a vertical ultra-precision positioning stage, and a horizontal ultra-precision positioning stage.

A principal object of the present invention is to provide enhanced mechanical designs for laminar weak-link rotary mechanisms for implementing angular rotations with a defined angular travel range and positioning resolution, such as, a ten-degree-level travel range and ten-nanoradian-level positioning resolution.

Other important aspects of the present invention are to provide such enhanced mechanical design for laminar weak-link rotary mechanisms for implementing angular rotations substantially without negative effect and that overcome some of the disadvantages of prior art arrangements.

SUMMARY OF THE INVENTION

In brief, enhanced mechanical designs are provided for weak-link rotary mechanisms for implementing angular rotations with a defined angular travel range and positioning resolution, for example, with ten-degree-level travel range and ten-nanoradian-level positioning resolution. Angular rotations include a defined angular travel range and positioning resolution that are repeatable and reliably provided.

A weak-link rotary structure includes a predetermined pattern for implementing angular rotations with a plurality of connecting links radially extending from a central portion with a predefined angular separation between the connecting links. Alternate ones of the plurality of connecting links are coupled to a respective terminal mounted to a connecting carriage. Remaining other ones of the plurality of connecting links are coupled to a respective mounting portion of a mating part of the weak-link rotary structure. The respective mounting portions of the mating part are mounted on an associated member providing angular rotations with repeatable and reliable angular travel range and positioning resolution.

The mating part of the weak-link rotary structure has a substantially circular perimeter with an adjacent band portion. The terminals mounted to the connecting carriage have a generally rectangular or parallelogram shape and are located proximate to interior band portion. The respective mounting portions of the mating part extending inwardly from the interior band portion have a generally rectangular shape.

In accordance with features of the invention, the weak-link rotary structure significantly extends the angular travel range over prior art arrangements, while maintaining stiffness and resolution for rotary ultra-precision applications, such as, scanning stage systems and X-ray based systems.

In accordance with features of the invention, the weak-link rotary structure is a laminar structure including a stack of a plurality of thin material structures formed, for example, of stainless steel, or an aluminum material, with multiple weak-link connections providing controllable angular rotations and having a desired stiffness and stability.

A laminar weak-link rotary positioning stage includes a pair of weak-link rotary structures supported by a cylindrical supporting structure, and a linear actuator coupled to a moving arm. A single laminar weak-link rotary positioning stage implements repeatable and reliable angular rotations with a defined angular travel range and positioning resolution, for example, with approximately five-degree-level travel range and ten-nanoradian-level positioning resolution.

In accordance with features of the invention, a pair of laminar weak-link rotary positioning stages implements repeatable and reliable angular rotations with a defined angular travel range and positioning resolution, for example, with approximately ten-degree-level travel range and ten-nanoradian-level positioning resolution.

In accordance with features of the invention, the weak-link rotary structure functions as a spring, returning to an original position after implementing repeatable and reliable angular rotations.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a novel mechanical design provides enhanced laminar weak-link rotary mechanisms for implementing repeatable and reliable angular rotations, for example, with five or ten-degree-level travel ranges and ten-nanoradian-level positioning resolution.

Figure 1:
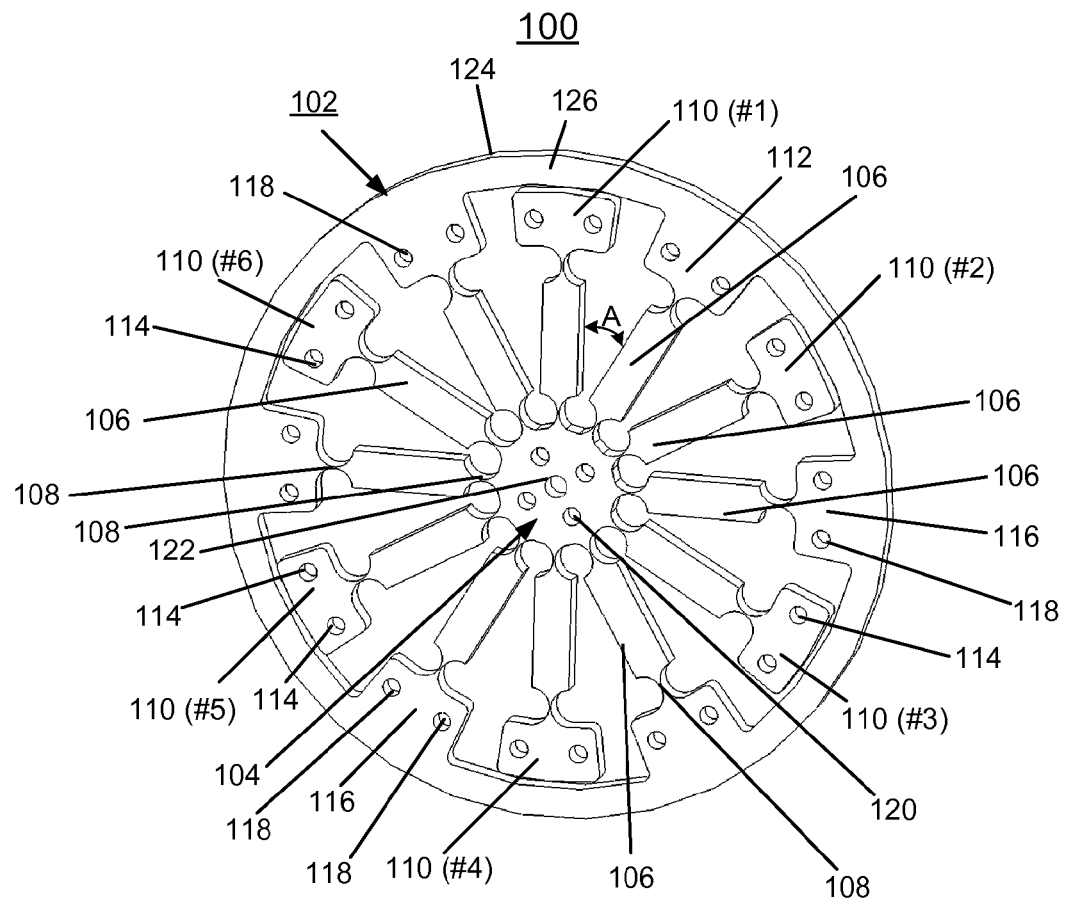
FIG. 1 schematically illustrates not to scale an exemplary laminar weak-link rotary structure in accordance with the preferred embodiment.
Figure 2:
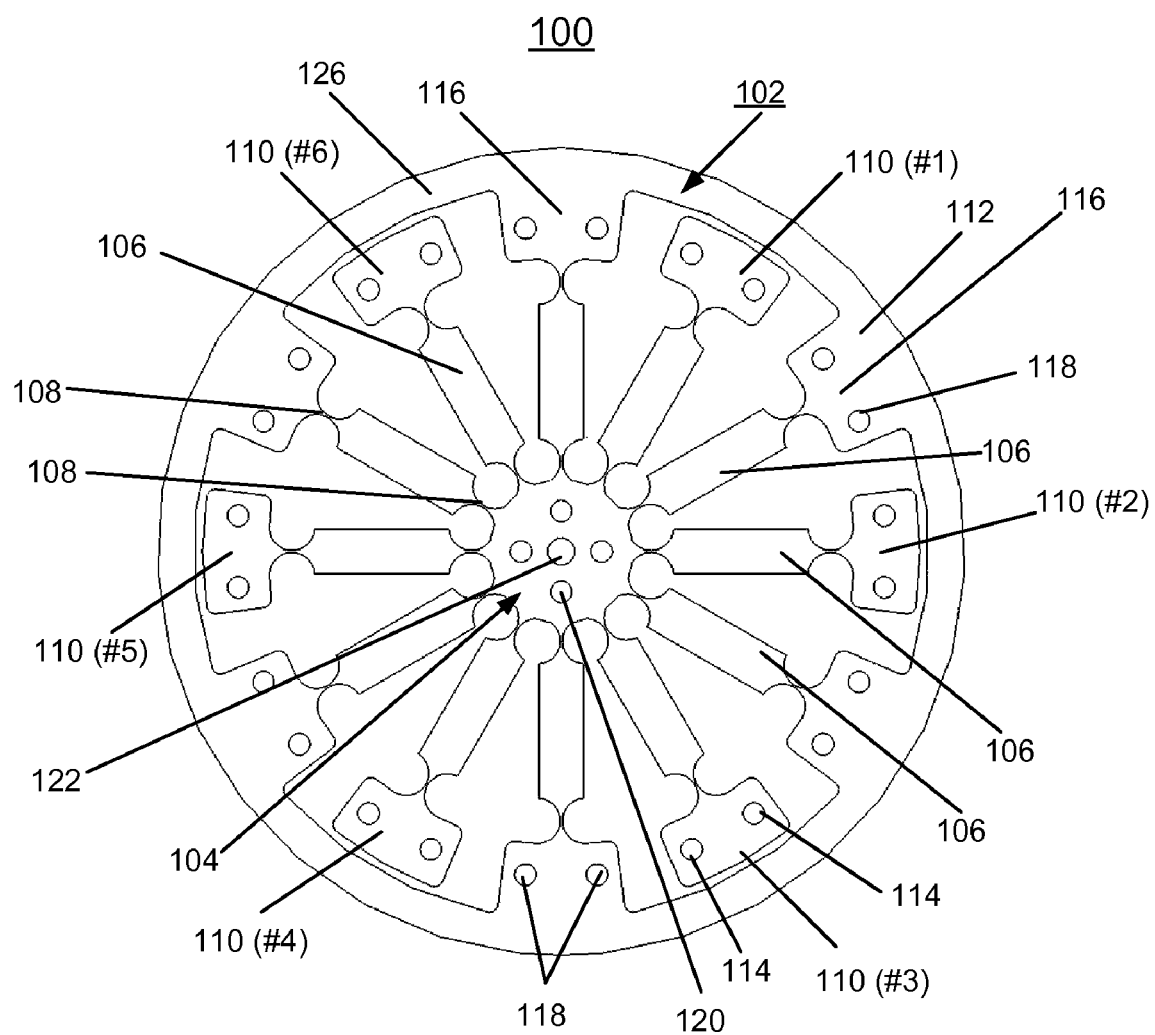
FIG. 2 is a plan view schematically illustrating not to scale the exemplary laminar weak-link rotary structure of FIG. 1 in accordance with the preferred embodiment.

Having reference now to the drawings, FIG. 1 schematically illustrates not to scale an exemplary laminar weak-link rotary structure in accordance with the preferred embodiment generally designated by the reference character 100. The laminar weak-link rotary structure 100 is a redundantly constrained weak-link structure including a predefined pattern generally designated by the reference character 102. Referring also to FIG. 2 there is shown a top view not to scale of the exemplary laminar weak-link rotary structure 100 of FIG. 1 in accordance with the preferred embodiment.

In accordance with features of the invention, a weak-link rotary structure 100 of the invention significantly extends the angular travel range over prior art arrangements, while maintaining stiffness and resolution for rotary ultra-precision applications, such as, scanning stage systems and X-ray based systems. The weak-link rotary structure is a laminar structure including a stack of a plurality of thin material structures formed, for example, of stainless steel, or an aluminum material, having a predefined pattern with multiple weak-link connections providing controllable angular rotations and having a desired stiffness and stability. In the weak-link rotary structure 100 of FIGS. 1 and 2 the thin material structures of the invention are precisely stacked together. The method for producing the redundantly constrained laminar weak-link rotary structure 100 of the invention is carried out by lithographic techniques.

In accordance with features of the invention, each of the weak-link rotary structures 100 functions as a spring, returning to an original position after implementing angular rotations. The predefined pattern 102 with multiple weak-link connections providing controllable angular rotations is called a round fishbone-shape. The weak-link rotary structure 100 of the invention advantageousl is applied to new development in the field of: ultra-precision positioning rotary stages for tomography with scanning x-ray nanoprobe, x-ray optics, nanotechnology and semiconductor manufacturing equipment.

In accordance with features of the invention, the predefined pattern 102 with multiple weak-link connections providing controllable angular rotations is repeatedly chemically etched with a mask to produce a plurality of individual identical structures or units. The units are stacked together to form the laminar structure 100 and are secured together with fasteners. A high quality adhesive can be applied to the sides of the laminar structure 100 to provide the mechanism equivalent to a single piece mechanism.

The laminar weak-link rotary structure 100 advantageously is manufactured in accordance with the disclosures and teachings of the method for manufacturing the redundantly constrained laminar structures as weak-link mechanisms of the above-identified U.S. Pat. No. 6,607,840, issued Aug. 19, 2003and U.S. Pat. No. 6,984,335 issued Jan. 10, 2006 by Deming Shu, Thomas S. Toellner, E. Ercan Alp and assigned to the present assignee. The subject matter of the above identified U.S. Pat. Nos. 6,607,840, and 6,984,335 are incorporated herein by reference.

The predefined pattern 102 of the laminar weak-link rotary structure 100 includes a central portion generally designated by the reference character 104 and a plurality of connecting links 106 generally outwardly extending from the central portion 104 with a predefined angular separation between the connecting links indicated by arrows labeled A.

Each connecting link 106 has at least one pair of weak-link connections 108. The predefined pattern 102 of the laminar weak-link rotary structure 100 includes a respective terminal 110, #1-6, coupled to a respective alternate connecting link 106 of the plurality of angularly separated connecting links 106.

Each terminal 110, #1-6, having a generally parallelogram or rectangular shape includes for example, a pair of holes 114 used with locating pins or bolts (not shown) to mount the terminals 110 to a fixed base, not shown in FIGS. 1 and 2. Each terminal 110, #1-6 is substantially freestanding and generally remains stationary.

In accordance with features of the invention, the predefined pattern 102 of the laminar weak-link rotary structure 100 includes a mating part 112 for mounting on an associated member including one of a supporting base and a rotary stage moving top plate, not shown in FIGS. 1 and 2, providing precisely controlled rotational movement with stability with spring-type compression. The mating part 112 includes a plurality of integrally formed mounting portions 116. Each mounting portion 116 has a generally parallelogram or rectangular shape coupled to a respective remaining other alternate connecting link 106 of the plurality of angularly separated connecting links 106. Each of the plurality of mounting portions 116 include, for example, a pair of holes 118 used with locating pins or bolts (not shown) to mount the mounting portions 116 on the associated base or moving top plate member. The central portion 104 includes a plurality of openings 120 disposed around a central opening 122.

The mating part 112 of the weak-link rotary structure has an overall generally circular perimeter 124 with an adjacent band portion 126. The terminals 110, #1-6 mounted to the connecting carriage have a generally rectangular shape and are located proximate to interior band portion. The respective mounting portions 116 of the mating part 112 have a generally rectangular shape extending inwardly from the interior band portion 126 toward the central portion 104.

Figure 3:
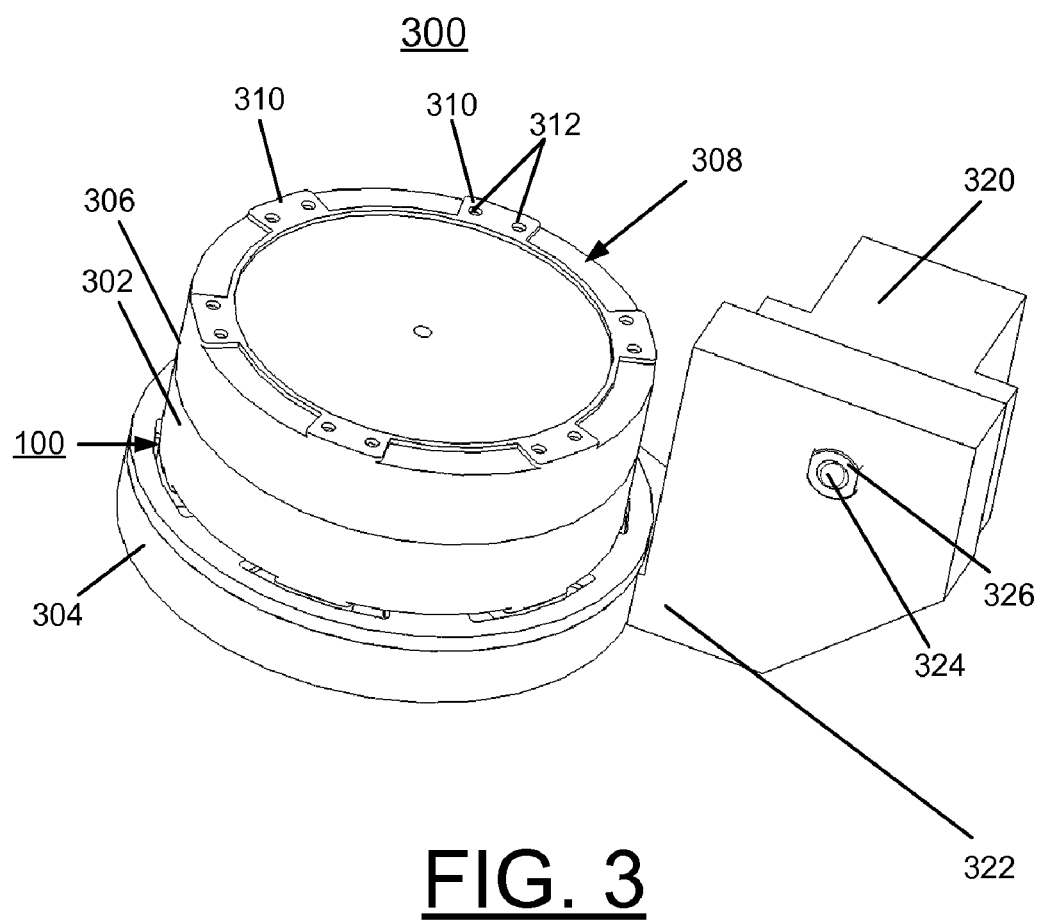
FIGS. 3, 4, and 5 schematically illustrate not to scale an assembly process of an ultra-precision positioning rotary stage for implementing angular rotations including a pair of the laminar weak-link rotary structures of FIG. 1 in accordance with the preferred embodiment.
Figure 4:
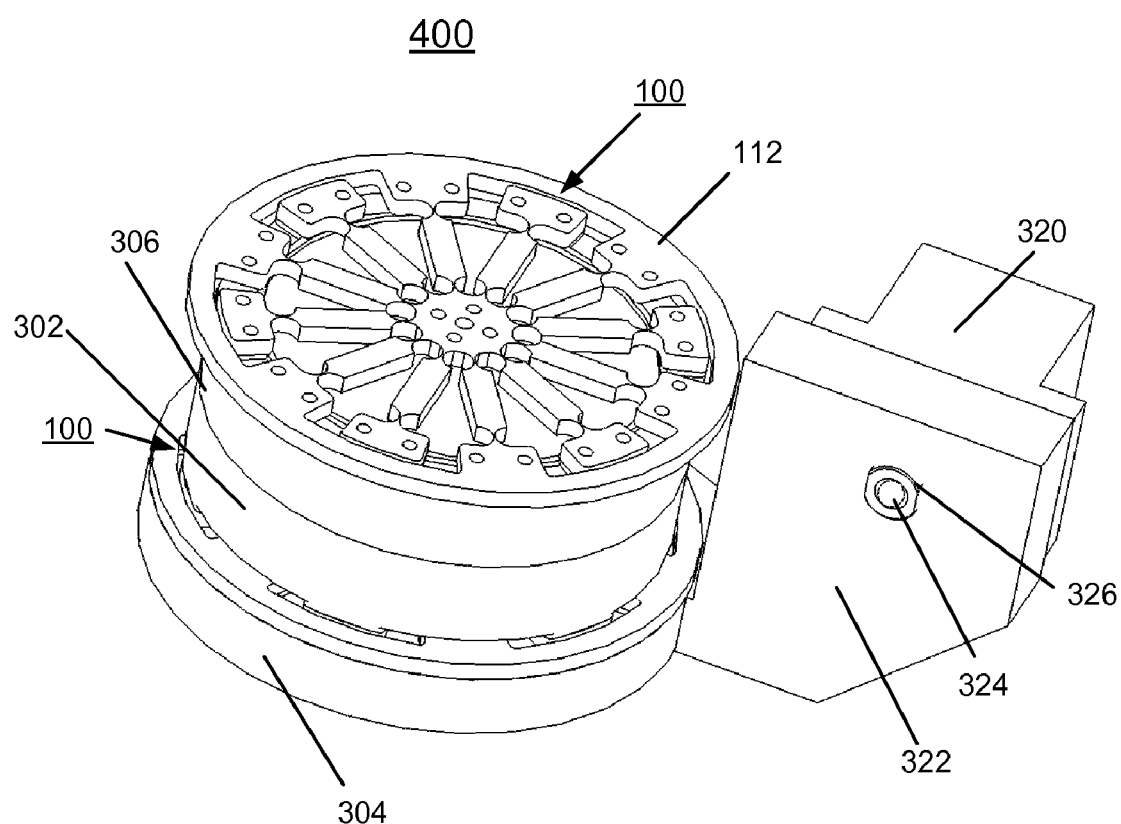
Figure 5:
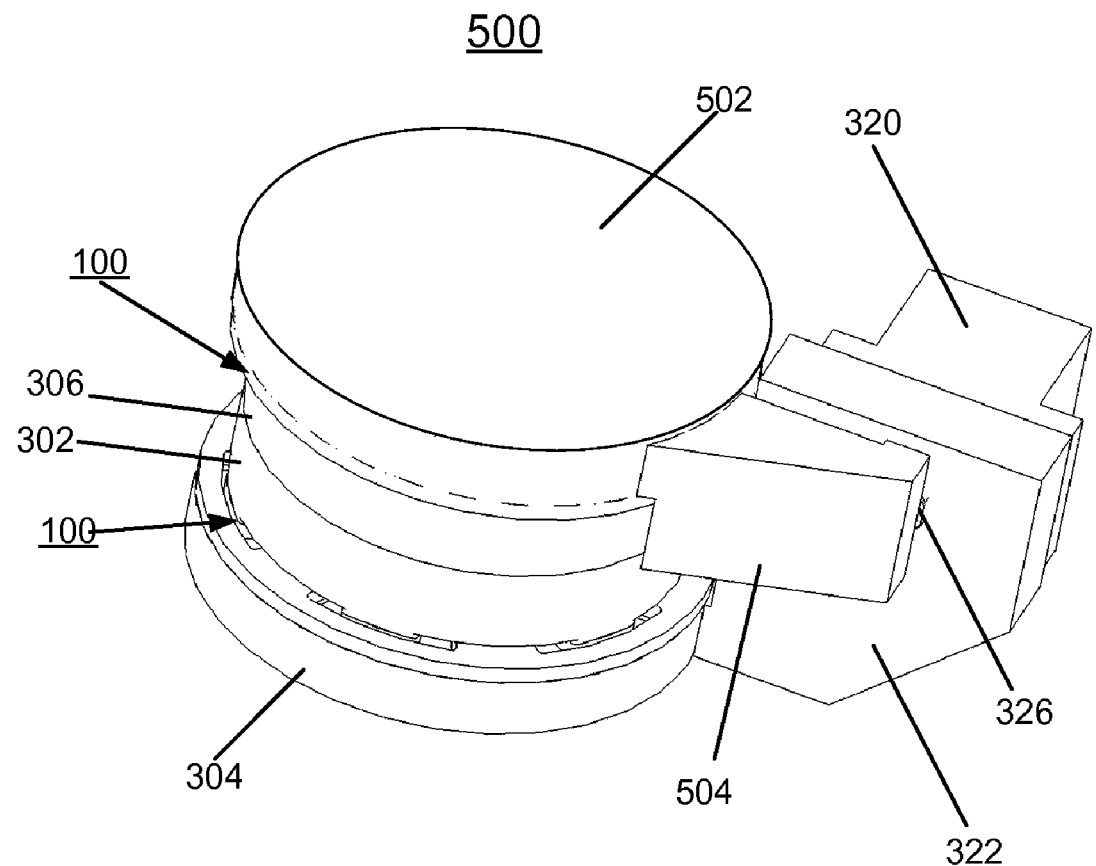

FIGS. 3, 4, and 5 schematically illustrate not to scale an assembly process for making an ultra-precision positioning rotary stage including a pair of the laminar weak-link rotary structures 100 in accordance with the preferred embodiment.

In FIG. 3, a partial assembly generally designated by the reference character 300 includes a first laminar weak-link rotary structure 100 mounted to a lower cylindrical connecting carriage portion 302, and mounted to a rotary stage supporting base 304. Both the lower cylindrical connecting carriage portion 302 and an upper cylindrical connecting carriage portion 306 include a mating face 308. The mating face 308 includes a plurality of cooperating mating portions 310, each having a pair of holes 312 for cooperatively aligned for positioning with the holes 114 of the respective terminals 110, #1-6. Optionally each of the lower and upper cylindrical connecting carriage portions 302, 306 is formed by an identical cylindrical supporting structure or together formed by a single unitary structure for mounting the pair of weak-link rotary structures 100. As shown, partial assembly 300 includes a linear actuator 320 coupled to a supporting base 322 for the linear actuator 320. The rotary stage supporting base 304 and the supporting base 322 can be separate members linked or mounted together or formed together by a single unitary structure. The linear actuator 320 includes a ball-ended linear actuator moving part 324 received through a bore in the supporting base 322.

The linear actuator 320 is implemented with a commercial linear actuator, for example, a piezoelectric transducer (PZT) or PZT-based nanopositioning motor model N-111 or N-214 NEXLINE motor manufactured and sold by PI GmbH and Company.

In FIG. 4, a next partial assembly generally designated by the reference character 400 includes a second laminar weak-link rotary structure 100 mounted to the upper cylindrical connecting carriage portion 306.

In FIG. 5, a complete assembly generally designated by the reference character 500 includes a rotary stage moving top plate 502 mounted to the second laminar weak-link rotary structure 100 that is mounted to the upper cylindrical connecting carriage portion 306. A rotary stage moving arm 504 engaging the ball-ended linear actuator moving part 324 operatively engages the carriage 502.

Figure 6:
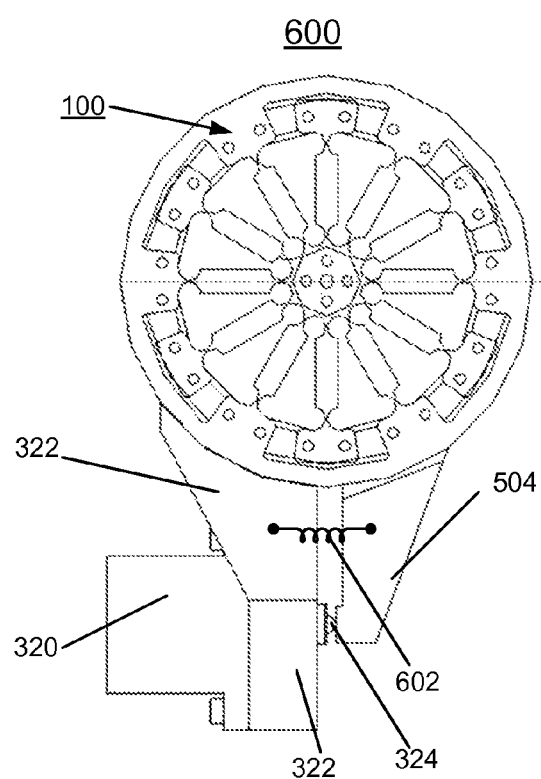
FIGS. 6, and 7 schematically illustrate not to scale an ultra-precision positioning rotary stage for implementing angular rotations including a pair of the laminar weak-link rotary structures of FIG. 1 in accordance with the preferred embodiment.
Figure 7:
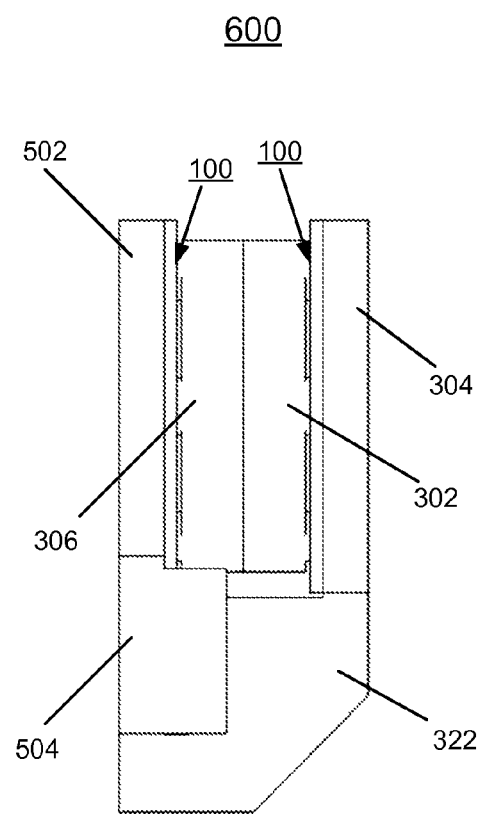

FIGS. 6, and 7 schematically illustrate not to scale a single, ultra-precision positioning rotary stage generally designated by the reference character 600 including the laminar weak-link rotary structures 100 in accordance with the preferred embodiment. In FIG. 6, a top view of the ultra-precision positioning rotary stage 600 is shown and illustrating interior detail of the laminar weak-link rotary structure 100. In FIG. 7, a side view of the ultra-precision positioning rotary stage 600 is shown. In FIGS. 6, and 7, the same reference numbers as used in FIGS. 1-5 are used for identical and similar components. The ultra-precision positioning rotary stage 600 includes a tensional spring 602 coupled between the rotary stage moving arm 504 and the supporting base 322 to accommodate clockwise rotation for the laminar weak-ling rotary structure 100.

In accordance with features of the invention, the single weak-link rotary positioning stage 600 includes a pair of weak-link rotary structures 100 supported by the cylindrical connecting carriage portions 302, 306, and a linear actuator 320 with the ball-ended linear actuator moving part 324 engaging the rotary stage moving arm 504. The single laminar weak-link rotary positioning stage 600 implements angular rotations with a defined angular travel range and positioning resolution, for example, with approximately five-degree-level travel range and ten-nanoradian-level positioning resolution.

Figure 8:
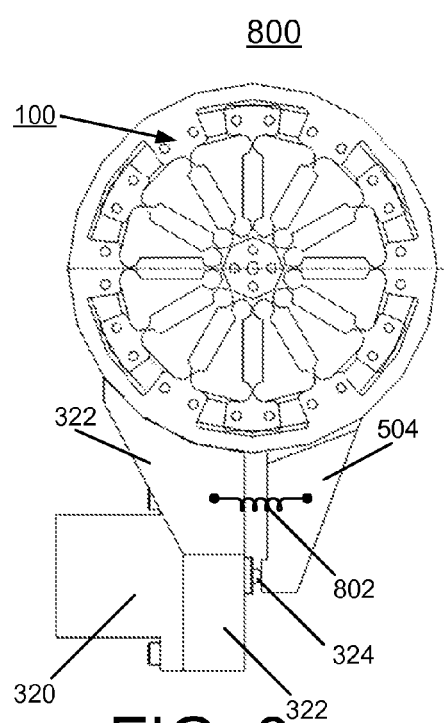
FIGS. 8, and 9 schematically illustrate not to scale a pair of ultra-precision positioning rotary stages for implementing angular rotations, each including a pair of the laminar weak-link rotary structures of FIG. 1 in accordance with the preferred embodiment.
Figure 9:
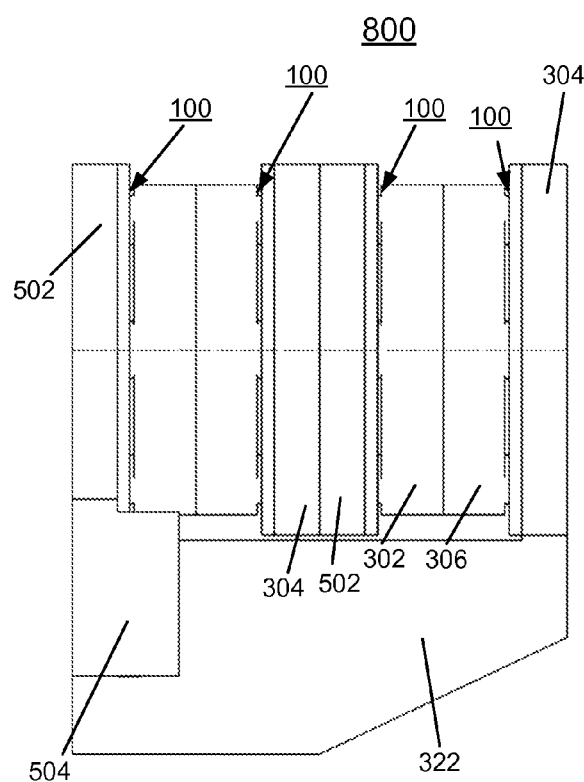

FIGS. 8, and 9 schematically illustrate not to scale a pair of ultra-precision positioning rotary stages generally designated by the reference character 800 including the laminar weak-link rotary structure of FIG. 1 in accordance with the preferred embodiment. In FIG. 8, a top view of the ultra-precision positioning rotary stages 800 is shown and illustrating interior detail of the laminar weak-link rotary structure 100. In FIG. 9, a side view of the ultra-precision positioning rotary stages 800 is shown. In FIGS. 8, and 9, the same reference numbers as used in FIGS. 1-5 are used for identical and similar components. The pair of ultra-precision positioning rotary stages 800 includes a tensional spring 802 coupled between the rotary stage moving arm 504 and the supporting base 322 to accommodate clockwise rotation for the laminar weak-link rotary structure 100.

In accordance with features of the invention, the pair of ultra-precision positioning rotary stages 800 includes two pairs of weak-link rotary structures 100, each pair respectively supported by the cylindrical connecting carriage portions 302, 306, and a linear actuator 320 with the ball-ended linear actuator moving part 324 engaging the rotary stage moving arm 504. The pair of laminar weak-link rotary positioning stages 800 implements angular rotations with a defined angular travel range and positioning resolution, for example, with ten-degree-level travel range and ten-nanoradian-level positioning resolution.

In accordance with features of the invention, multiple stages can be combined so that larger rotations, in multiples of about 5-degrees per stage are provided. Advantages of the present invention are that very repeatable precise rotations are enabled, which currently are not possible with existing technology.

While the present invention has been described with reference to the details of the embodiments of the invention shown in the drawing, these details are not intended to limit the scope of the invention as claimed in the appended claims.

What is claimed is:

1. A mechanical design for weak-link rotary mechanisms comprising:
a weak-link rotary structure, said weak-link rotary structure having a predetermined pattern for implementing angular rotations including
a plurality of connecting links radially extending from a central portion with a predefined angular separation between the connecting links; each said connecting link having at least one pair of weak-link connections;
alternate ones of said plurality of connecting links being coupled to a respective terminal, each said respective terminal being mounted to a connecting carriage;
remaining other ones of said plurality of connecting links being coupled to a respective mounting portion of a mating part of the weak-link rotary structure; said respective mounting portions of the mating part being mounted on an associated member for providing angular rotations with set angular travel range and positioning resolution.

2. The mechanical design for weak-link rotary mechanisms as recited in claim 1 wherein said weak-link rotary structure is a laminar weak-link rotary structure.

3. The mechanical design for weak-link rotary mechanisms as recited in claim 1 wherein said weak-link rotary structure has a substantially circular perimeter.

4. The mechanical design for weak-link rotary mechanisms as recited in claim 1 wherein said weak-link rotary structure is formed of a stainless steel material.

5. The mechanical design for weak-link rotary mechanisms as recited in claim 1 wherein said weak-link rotary structure is formed of an aluminum material.

6. The mechanical design for weak-link rotary mechanisms as recited in claim 1 wherein said weak-link rotary structure functions as a spring, returning to an original position after implementing repeatable and reliable angular rotations.

7. The mechanical design for weak-link rotary mechanisms as recited in claim 1 wherein said mating part of the weak-link rotary structure has a substantially circular perimeter and an adjacent interior band portion.

8. The mechanical design for weak-link rotary mechanisms as recited in claim 7 wherein each said terminal is located proximate to said interior band portion.

9. The mechanical design for weak-link rotary mechanisms as recited in claim 7 wherein each said respective mounting portion of said mating part extends inwardly toward said central portion from said interior band portion.

10. The mechanical design for weak-link rotary mechanisms as recited in claim 1 wherein each said terminal mounted to the connecting carriage has a generally rectangular shape.

11. The mechanical design for weak-link rotary mechanisms as recited in claim 1 wherein each said respective mounting portion of said mating part has a generally rectangular shape.

12. The mechanical design for weak-link rotary mechanisms as recited in claim 1 wherein said weak-link rotary structure has a predefined stiffness.

13. The mechanical design for weak-link rotary mechanisms as recited in claim 1 wherein said multiple weak-link connections of said weak-link rotary structure enable controllable angular rotations.

14. The mechanical design for weak-link rotary mechanisms as recited in claim 1 wherein a single laminar weak-link rotary positioning stage includes a pair of said weak-link rotary structures.

15. The mechanical design for weak-link rotary mechanisms as recited in claim 14 wherein said pair of said weak-link rotary structures is supported by a cylindrical supporting base structure.

16. The mechanical design for weak-link rotary mechanisms as recited in claim 15 includes a linear actuator having a ball-ended linear actuator moving part coupled to a moving arm structure.

17. The mechanical design for weak-link rotary mechanisms as recited in claim 14 wherein said single laminar weak-link rotary positioning stage implements repeatable and reliable angular rotations with a defined angular travel range and positioning resolution with approximately five-degree-level travel range and ten-nanoradian-level positioning resolution.

18. The mechanical design for weak-link rotary mechanisms as recited in claim 14 wherein a pair of said single laminar weak-link rotary positioning stages implements repeatable and reliable angular rotations with a defined angular travel range and positioning resolution with approximately ten-degree-level travel range and ten-nanoradian-level positioning resolution.

\* \* \* \* \*